United States Patent [19]

Shirataki

[11] Patent Number: 5,354,244
[45] Date of Patent: Oct. 11, 1994

[54] AUTOMATIC TRANSMISSION

[75] Inventor: Hirobumi Shirataki, Fuji, Japan

[73] Assignee: Jatco Corporation, Fuji, Japan

[21] Appl. No.: 956,861

[22] Filed: Oct. 5, 1992

[30] Foreign Application Priority Data

Oct. 3, 1991 [JP] Japan .................................. 3-256482

[51] Int. Cl.$^5$ ............................................ F16H 3/62
[52] U.S. Cl. .................................................. 475/205
[58] Field of Search ............... 475/276, 311, 204, 205, 475/219, 284, 288

[56] References Cited

U.S. PATENT DOCUMENTS

| 2,912,884 | 11/1959 | Christenson et al. | 475/276 X |
| 4,660,439 | 4/1987 | Hiraiwa | 475/284 X |
| 4,899,621 | 2/1990 | Sakakibara | 475/205 |
| 4,916,977 | 4/1990 | Aoki et al. | 475/205 |
| 5,203,749 | 4/1993 | Ito | 475/204 |
| 5,224,907 | 7/1993 | Shirataki | 475/205 |

FOREIGN PATENT DOCUMENTS

| 58-17253 | 2/1983 | Japan | 475/205 |
| 58-21061 | 2/1983 | Japan | 475/205 |
| 59-117943 | 7/1984 | Japan | 475/276 |
| 63-145846 | 6/1988 | Japan | 475/205 |

Primary Examiner—Dirk Wright
Attorney, Agent, or Firm—Foley & Lardner

[57] ABSTRACT

An automatic transmission is of the type wherein power from a main change speed gearing is delivered to an input gear of an auxiliary change speed gearing. The input gear is connected to a ring gear of a planetary gear set of the auxiliary change speed gearing. The planetary gear set includes a pinion carrier connected to an output shaft with an output gear fro rotation therewith. The pinion carrier rotatably supports a plurality of pinions in mesh with the ring gear. A shaft is arranged in line with the output shaft and is formed with a sun gear in mesh with the plurality of pinions. This shaft is brakeable by a frictional coupling device, namely a brake. When this shaft with the sun gear is braked, the power is delivered to the output gear via the pinion carrier.

2 Claims, 3 Drawing Sheets

FIG. 3

| | C1 | C2 | C3 | B1 | B2 | B3 | OWC1 | OWC2 |
|---|---|---|---|---|---|---|---|---|
| FIRST | | ○ | | | | ○ | ○ | |
| SECOND | ○ | ○ | | ○ | □ | ○ | | |
| THIRD | ○ | ○ | | | | ○* | | △ |
| FOURTH | ○ | ○ | ○ | | | | | |
| REVERSE | ○ | | | | ○ | ○ | | |

○ : ENGAGEMENT (OR APPLICATION) OF FRICTIONAL COUPLING DEVICE

□ : APPLICATION UPON MANUAL SELECT OF FIRST

△ : RENDERED OPERATIVE TILL APPLICATION OF B3

○* : DELAYED UPON APPLICATION BUT QUICK RELEASE

AUTOMATIC TRANSMISSION

BACKGROUND OF THE INVENTION

The present invention relates to an automatic transmission for an automotive vehicle of the front engine front drive type, and more particularly to an automatic transmission wherein torque from a main change speed gearing is delivered via an auxiliary change speed gearing and an output gear of the auxiliary change speed gearing.

Automatic transmissions are known which include an auxiliary change speed gearing in additional to a main change speed gearing to increase the number of speeds.

An object of the present invention is to improve an automatic transmission such that the setting of a gear ratio during underdrive of a planetary gear set of an auxiliary change speed gearing can be made with increased freedom.

SUMMARY OF THE INVENTION

According to the present invention, there are provided in an automatic transmission:
a main change speed gearing having an output shaft;
an auxiliary change speed gearing drivingly connected to said main change speed gearing;
said auxiliary change speed gearing having a frictional coupling device and a planetary gear set including a sun gear formed on a shaft that has one end coupled with a component of said frictional coupling device.

BRIEF DESCRIPTION OF THE DRAWINGS

FIG. 3 is a table of engagement or release of each of frictional coupling devices versus each of speeds.

DETAILED DESCRIPTION OF THE INVENTION

Figure 1:
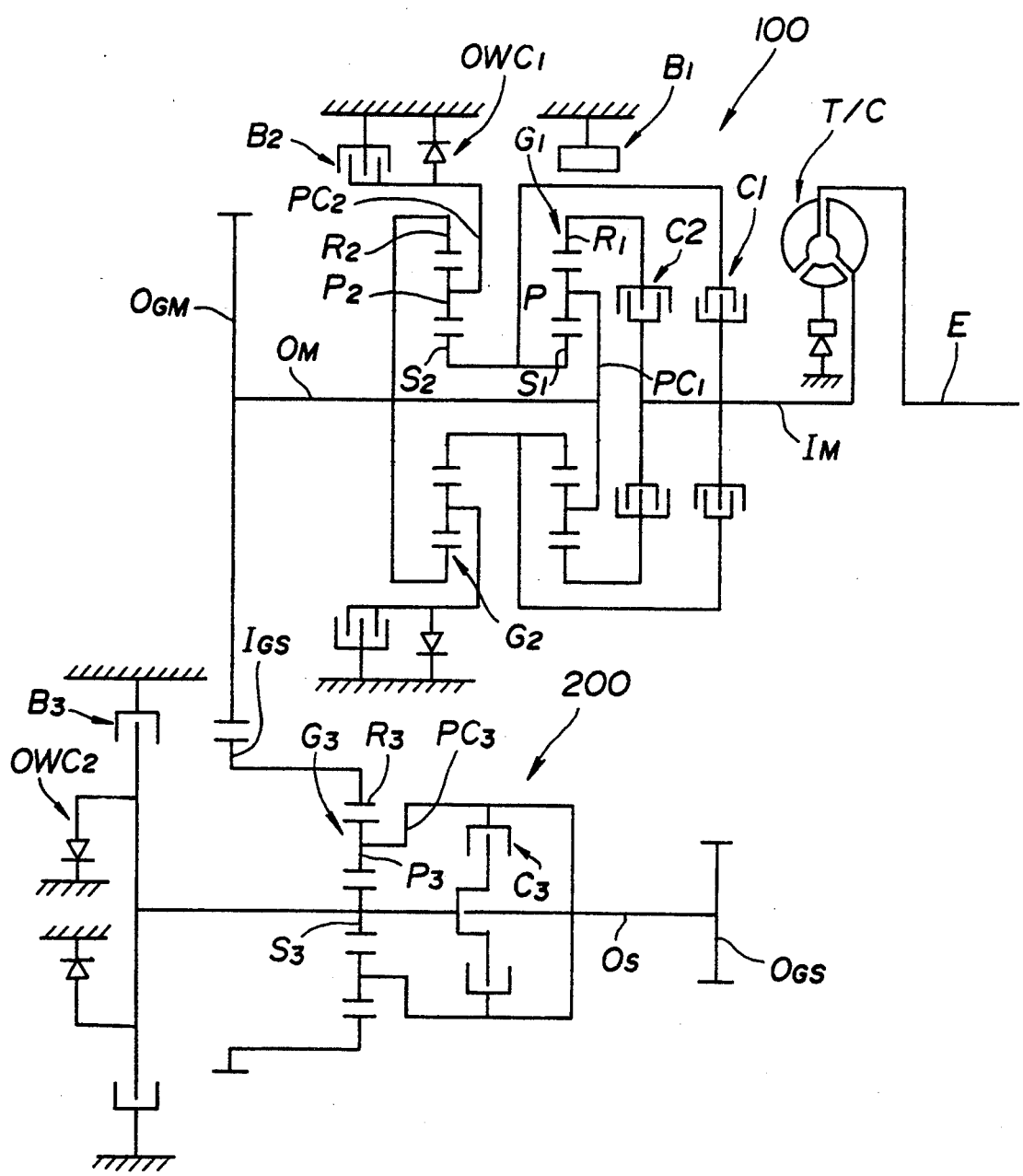
FIG. 1 is a schematic view of an automatic transmission shown in FIG. 2.
Figure 2:
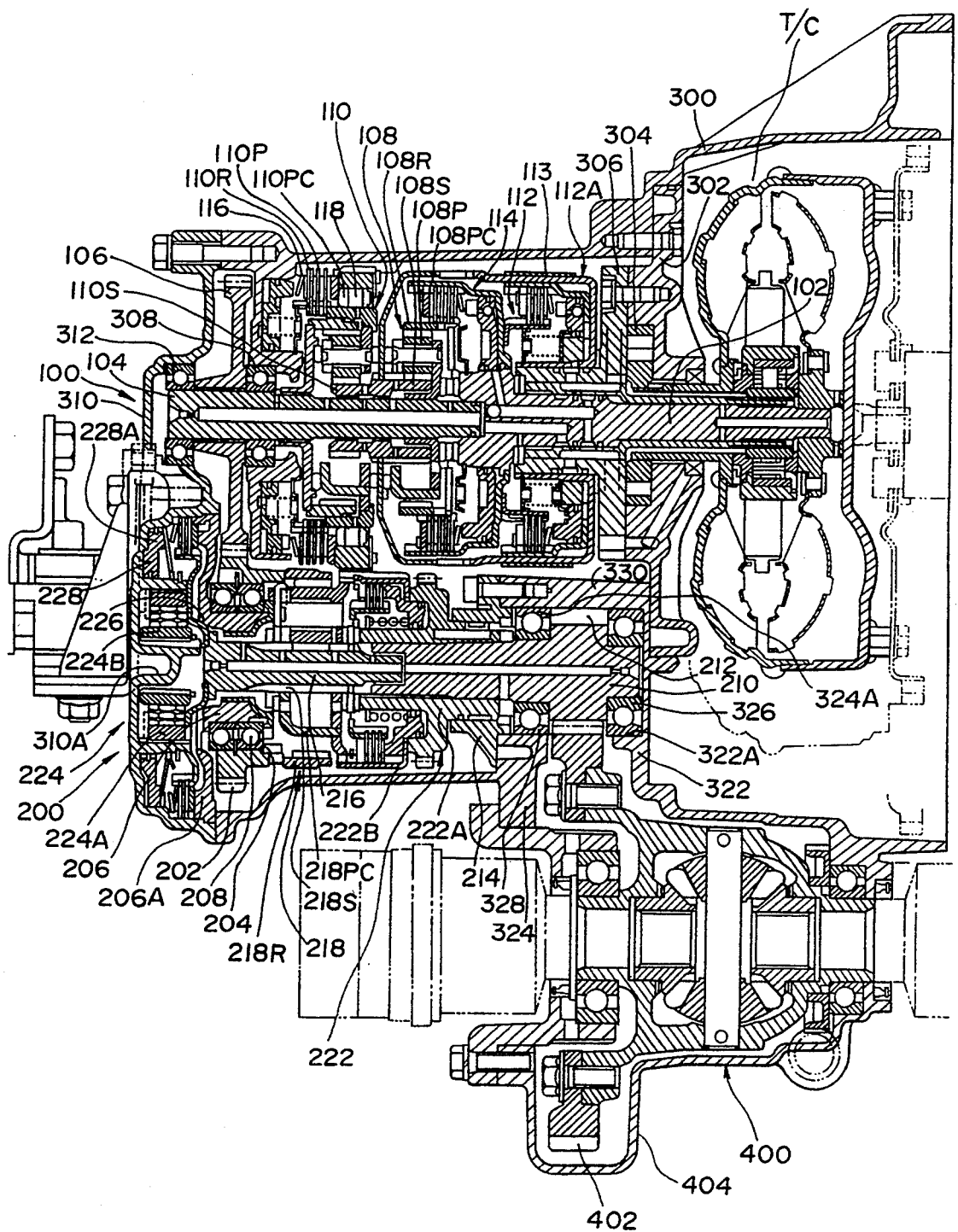
FIG. 2 is a detailed section of the automatic transmission.

Referring to FIGS. 1 and 2, an automatic transmission for an automative vehicle of the front engine front drive type is described. This automatic transmission provides four forward speeds and one reverse.

The automatic transmission includes a main change speed gearing 100 which provides three forward speeds and one revese and an auxiliary change speed gearing 200 which is shiftable to a direct drive or an underdrive. The arrangement is such that the auxiliary change speed gearing 200 has its axis of rotation laying in parallel with respect to an axis of rotation of the main change speed gearing 100.

The main change speed gearing 100 is known and thus explained briefly. As shown in FIG. 1, a main input shaft $I_M$ is subject to torque transmitted thereto from an engine output shaft E via a torque converter T/C. This main input shaft $I_M$ is arranged in line with a main output shaft $O_M$. Arranged on or around both of the shafts $I_M$ and $O_M$ are a first planetary gear set $G_1$, a second planetary gear set $G_2$, a first clutch $C_1$, a second clutch $C_2$, a first brake $B_1$, a second brake $B_2$ and a first one-way clutch $OWC_1$.

The first planetary gear set $G_1$ includes a sun gear $S_1$, a ring gear $R_1$, and a pinion carrier $PC_1$ rotatably supporting a plurality of pinions $P_1$, each being in mesh with both the sun and ring gears $S_1$ and $R_1$. The second planetary gear set $G_2$ includes a sun gear $S_2$, a ring gear $R_2$, and a pinion carrier $PC_2$ rotatably supporting a plurality of pinions $P_2$, each being in mesh with both the sun and ring gears $S_2$ and $R_2$.

As is readily seen from FIG. 1, the sun gears $S_1$ and $S_2$ are connected to each other for unitary rotation and connectable via the first clutch $C_1$ to the main input shaft $I_M$. The ring gear $R_1$ of the first planetary gear set $G_1$ is connectable via the second clutch $C_2$ to the main input shaft $I_M$. The pinion carrier $PC_1$ of the first planetary gear set $G_1$ is connected to the ring gear $R_2$ of the second planetary gear set $G_2$ and also to the main output shaft $O_m$ for unitary rotation. The pinion carrier $PC_2$ of the second planetary gear set $G_2$ is prevented from rotating in a reverse direction opposite to a forward direction in which the main input shaft $I_M$ rotates.

The first brake of the band type is provided to anchor or brake the sun gears $S_1$ and $S_2$. The second brake $B_2$ of the disk type is provided to anchor or brake the pinion carrier $PC_2$ of the second planetary gear set $G_2$.

The main output shaft $O_M$ has a main output gear $O_{GM}$ splined thereto.

The auxiliary change speed gearing 200 includes an auxiliary input gear $I_{GS}$ in mesh with the main output gear $O_{GM}$ for rotation about an axis which lies in line with an axis of rotation of an auxiliary output shaft $O_S$. The auxiliary output shaft $O_S$ has an auxiliary output integral gear $O_{GS}$. Arranged between the auxiliary input gear $I_{GS}$ and auxiliary output shaft $O_S$ are a third planetary gear set $G_3$ and a third clutch $C_3$. On the opposite side of the auxiliary input gear $I_{GS}$ to that side where the third planetary gear set $G_3$ is arranged, there are provided a third brake $B_3$ and a second one-way clutch $OWC_2$.

The third planetary gear set $G_3$ includes a sun gear $S_3$, a ring gear $R_3$, and a pinion carrier $PC_3$ rotatably supporting pinions $P_3$, each being in mesh with both the sun and ring gears $S_3$ and $R_3$. The pinion carrier $PC_3$ is connected to the auxiliary output shaft $O_S$ for unitary rotation therewith. The ring gear $R_3$ is connected to the auxiliary input gear $I_{GB}$ for unitary rotation therewith. The sun gear $S_3$ is prevented from rotating in one direction by the second one-way clutch $OWC_2$ and brakeable by the third brake $B_3$. The sun gear $S_3$ is connectable to the auxiliary output shaft $O_S$ and the pinion carrier $PC_3$ via a third clutch $C_3$.

As will be seen from FIG. 3, the auxiliary change speed gearing 200 is conditioned in under drive position with the third brake $B_3$ applied and the third clutch $C_3$ disengaged to provide the first or second or third speed. Within the main change speed gearing 100, for the first speed, the first one-way clutch $OWC_1$ is operative to render the pinion carrier $OWC_1$ to serve as a reaction member with the second clutch $C_2$ engaged and with the first clutch $C_1$ disengaged and the first and second brakes $B_1$ and $B_2$ released. For an upshift from the first to second speed, the first brake $B_1$ is applied. For an upshift from the second to third speed, the first brake $B_1$ is released and the first clutch $C_1$ is engaged in timed relationship with the release of the first brake $B_1$.

An upshift from the third to fourth speed is made by releasing the third brake $B_3$ and engaging the third clutch $C_3$ in timed relationship with the release of the third brake $B_3$. In this case, the auxiliary change speed gearing 200 is conditioned in direct drive state, During the transient period from the third speed state to the fourth speed state, the second one-way clutch $OWC_2$ prevents rotation of the sun gear $S_3$.

A downshift from the fourth to third speed is effected by releasing the third clutch $C_3$ and applying the third brake $B_3$. Initiation of application of the third brake $B_3$ is delayed with respect to the release of the third clutch $C_3$ until the second one-way clutch $OWC_2$ is rendered operative.

Reverse is established with the first clutch $C_1$ engaged and the second and third brake $B_2$ and $B_3$ applied with the other clutches and brakes all disengaged and released.

FIG. 2 shows in detail the structure of the automatic transmission briefly explained in connection with FIG. 1.

Referring to FIG. 2, the reference numeral 300 designates a major casing in which a main change speed gearing 100 and an auxiliary change speed gearing 200 are arranged. Fixedly secured by bolts to the major casing 300 is a pump housing 302. A pump gear 304 is disposed within a space defined by the pump housing 302 and a pump cover 306 bolted to the pump housing 302. The pump gear 304 is driven by a pump impeller of a torque converter T/C. The pump impeller is driven by an engine.

With regard to the main change speed gearing 100 shown in FIG. 2, the reference numeral 102 designates a main input shaft that was denoted by the reference character $I_M$ in FIG. 1. The reference numeral 104 designates a main output shaft that was denoted by the reference character $O_M$. The main output shaft 104 is splined to a main output gear 106 that was denoted by the reference character $O_{GM}$.

The reference numerals 108 and 110 respectively designate a first planetary gear set that was denoted by the reference character $G_1$ in FIG. 1 and a second planetary gear set that was denoted by the reference character $G_2$ in FIG. 1. The first and second planetary gear sets 108 and 110 include sun gears 108S and 110S that were denoted by the reference characters $S_1$ and $S_2$. These sun gears 108S and 110S are connected to the main input shaft 102 for unitary rotation therewith. The first planetary gear set 108 includes a ring gear 108R that was denoted by the reference character $R_1$ in FIG. 1. The ring gear 108R is connectable to the main input shaft 102 via a second clutch 114 that was denoted by the reference character $C_2$. The first planetary gear set 108 includes a pinion carrier 108PC that was denoted by the reference character $PC_1$. The pinion carrier $108PC_1$ is connected to the main output shaft 104 by spline connection. The pinion carrier $108PC_1$ rotatably supports a plurality of pinions 108P that were denoted by the reference numeral $P_1$. A clutch casing 112A establishes connection between the sun gears 108S, 110S and the first clutch 112. Between the clutch casing 112A and the major casing 300 is arranged a first brake of the band type 113 that was denoted by the reference character $B_1$. The band of the first brake 113 tighten a brake drum portion of the clutch casing 112A to hold stationary both of the sun gears 108S and 110S.

The second planetary gear set 110 includes a ring gear 110R that was denoted by the reference numeral $R_2$. The ring gear 110R is connected to the main shaft 104 by spline connection. The second planetary gear set 110 includes a pinion carrer 110PC that was denoted by the reference character $PC_2$. The pinion carrier $PC_2$ rotatably supports a plurality of pinions 110P that were denoted by the reference character $P_2$. Arranged between the pinion carrier 110PC and the major casing 300 are a second brake 116 and a first one-way clutch 118 that were denoted by the reference characters $B_2$ and $OWC_1$ in FIG. 1.

The main output shaft 104 is rotatably supported by bearing 308 fixedly mounted to a portion adjacent an end portion of the major casing 300 and by bearing 312 fixedly mounted to a casing cover 310 bolted to the major casing 300. Disposed between both of the bearings 308 and 312 is the main output gear 106.

In the auxiliary change speed gearing 200, the reference numeral 202 designates an auxiliary input gear that was denoted by the reference character $I_{GS}$ in FIG. 1. The auxiliary input gear 202 which is in mesh with the main output gear 106 is hollowed and rotatably supported by an outer race of bearing 204 of the double ball type. The bearing 204 has an inner race supported by a boss portion of a bearing support 206 and fixed thereto by means of a nut 208 threadedly engaged with the inner peripheral wall of the boss portion. The bearing support 206 has an outer peripheral portion fixedly connected to the casing cover 310 by spline connection. The bearing support 206 has an outer peripheral portion defining a plate support 206a for a third brake described later.

The reference numeral 210 designates an auxiliary output shaft that was denoted by the reference character $O_S$ in FIG. 1. The auxiliary output shaft 210 has an integral auxiliary output gear 212 that was denoted by the reference character $O_{GS}$. This auxiliary output gear 212 is in mesh with a ring gear 402 of a final drive 400.

The auxiliary output shaft 210 with the output gear 212 is rotatably supported by two axially spaced bearings 326 and 328 which are fixedly mounted to two spaced first and second walls 322 and 324 of the major casing 300, respectively. These walls 322 and 324 are provided for separating the final drive 400 from the change speed mechanism of the auxiliary change speed gearing 200 in fluid tight manner. The first wall 322 has a portion to which the pump housing 302 is fixed and it is formed with a recess 322A fixedly receiving an outer race of the bearing 326.

The second wall 324 is formed with a bore 324A fixedly receiving an outer race of the bearing 328. The second wall 324 has an integral partition wall 300 which merges continuously into the first wall 322. The separation in fluid tight manner is established except fluid communication through the bore 324A.

The bearing 328 which is press fit in the bore 324A is operative to prevent axial flow of oil through the bore 324A since the bearing 328 is of the so-called oil seal type.

The recess 322A, auxiliary output gear 212 and bore 324A have substantially the same diameter so as to make easy forming the bore 324A and recess 322A and assembling of associated components of the auxiliary output gear 212.

Designated by the reference numeral 214 is a bearing cap bolted to the second wall 324 to hold the bearing 328 within the bore 324A.

The auxiliary output shaft 210 is formed with an axial bearing bore 210A extending inwardly from the remotest end from that end portion thereof which has the auxiliary output gear 212. The axial bearing bore 201A rotatably receives via a needle bearing a reduced diameter leading end of a brake shaft 216. The brake shaft 216 is formed with a sun gear 218S that was denoted by the reference character $S_3$ in FIG. 1. This sun gear 218S is one of components of a third planetary gear set 218 that was denoted by the reference character G3 in FIG. 1. The third planetary gear set 218 includes a ring gear 218R that was denoted by the reference character R3. The ring gear 218R is connected to the auxiliary input gear 202 for unitary rotation. The third planetary gear set 218 includes a pinion carrier 218PC that was denoted by the reference numeral PC3. The pinion carrier 218PC rotatably supports a plurality of pinions 218P that were denoted by the reference character P3. Via a clutch body 222A and a clutch drum 222B that is fixedly connected to the clutch body 222A, the pinion carrier 218PC is fixedly connected to the auxiliary output shaft 210 for unitary rotation. The clutch body 222A is splined to the auxiliary output shaft 210. The clutch body 222A and clutch drum 222B form parts of a third clutch 222 that was denoted by the reference character C3 in FIG. 1.

Within the clutch drum 222B is a clutch hub splined to the sun gear 218S. The brake shaft 216 has fixed thereto a radial support plate 226 fixed to an outer race 224A of a second one-way clutch 224 that is denoted by the reference character OWC2 in FIG. 1. An inner race 224B of the second one-way clutch 224 is splined to an integral inward projection 310A of the casing cover 310.

Arranged around the second one-way clutch 224 is a third brake 228 that is denoted by the reference character B3. The third brake 228 is of the frictional disk type including a set of interleaved plates consiting of a group of plates having their outer periphery splined to the casing cover 310 and another group of plates having their inner periphery splined to a sleeve extension of the support plate 226. The third brake 228 also includes a piston 228A biased by a return spring.

The final drive 400 is enclosed in fluid tight manner by a final drive casing 404.

The operation regarding the auxiliary change speed gearing 200 is explained again.

For the first to third forward speeds or reverse, the auxiliary change speed gearing 200 is conditioned in underdrive state owing to application of the third brake 228 ($B_3$) and disengagement of the third clutch 222 ($C_3$). Under this condition, the brake shaft 216 and thus the third sun gear 218S ($S_3$) is held stationary relative to the casing cover 310. Thus, the third planetary gear set 218 ($G_3$) provides a reduction drive in transmitting rotation from the auxiliary input gear 202 ($I_{GS}$) to the auxiliary output shaft 210 ($O_S$) via the ring gear 218R ($R_3$) and the pinion carrier 218PC ($PC_3$).

For the third planetary gear set 218, if the number of teeth of the sum gear 218S is expressed by $Z_S$, the number of rotation per unit time of the sun gear 218S is expressed by $N_S$, the number of teeth of the ring gear 218R is expressed by $Z_R$, the number of rotation per unit time of the ring gear 218R is expressed by $N_R$, and the number of rotation per unit time of the pinion carrier 218PC is expressed by $N_{PC}$, the third planetary gear set 218 can be expressed by the following formula:

$$(1+a)N_C = aN_S + N_R \qquad (1)$$

where:

$a = Z_S/Z_R$.

Considering the underdrive state, since the sun gear 218S is held stationary and thus $N_S=0$, the formula (1) is converted to:

$$(1+a)N_C = N_R \qquad (2).$$

Thus, a gear ratio i given by the third planetary gear set 218 is expressed as:

$$i = N_R/N_C = 1+a = Z_S/Z_R \qquad (3).$$

As will be appreciated from the formula (3), if the the ratio a becomes small, the gear ratio i becomes small. This means that if the number of teeth of the sun gear 218S ($S_3$) which is expressed by $Z_S$ decreases, the gear ratio i becomes small. In this manner, the setting freedom of the gear ratio has been increased.

For the fourth forward speed, the third brake 228 ($B_3$) is released and the third clutch 222 ($C_3$) is engaged. This caused the third planetary gear set 218 ($G_3$) to rotate as a unit, thus providing a direct drive state.

From the foregoing, it is now seen that the shaft 216 is held stationary for the first to third speeds and reverse and it is released to rotate as a unit with the other components of the third planetary gear set 218 for the fourth speed. Thus, the sun gear 218S with which the shaft 216 is formed is not subject to any stress from the shaft 216 which might cause irregular engagement with the pinions 218P resulting in making noise.

What is claimed is:

1. An automatic transmission comprising a main speed changing device and an auxiliary speed changing device drivingly connected to said main speed changing device, said auxiliary speed changing device comprising a planetary gear set, a brake shaft having first and second ends, a frictional coupling device disposed at said first end of said brake shaft, and a clutch disposed at said second end of said brake shaft, said brake shaft including a plurality of splines integrally formed as a part of said brake shaft, said splines functioning as a sun gear for said planetary gear set thereby allowing a greater range of gear ratios.

2. An automatic transmission according to claim 1, wherein said plurality of splines are defined by a series of longitudinal grooves in said brake shaft.

* * * * *